United States Patent
Park et al.

(10) Patent No.: US 7,305,851 B2
(45) Date of Patent: Dec. 11, 2007

(54) METHOD FOR FABRICATING SILICA GLASS CONTAINING BI AND TI USING A SOL-GEL PROCESS

(75) Inventors: Keun-Deok Park, Busan (KR); Soon-Jae Kim, Gumi-si (KR); Jung-Je Bang, Pohang-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 649 days.

(21) Appl. No.: 10/919,732

(22) Filed: Aug. 17, 2004

(65) Prior Publication Data

US 2005/0155385 A1   Jul. 21, 2005

(30) Foreign Application Priority Data

Jan. 19, 2004   (KR) .............. 10-2004-0004004

(51) Int. Cl.
*C03B 8/02* (2006.01)

(52) U.S. Cl. ............................ 65/17.2; 501/12

(58) Field of Classification Search ............. 65/17.2, 65/395, 440; 501/12; 516/31, 77, 98, 111
See application file for complete search history.

(56) References Cited

U.S. PATENT DOCUMENTS

| 4,422,965 | A | * | 12/1983 | Chickering et al. | ........... 588/12 |
| 4,902,650 | A | * | 2/1990 | Caldwell et al. | ............. 501/12 |

OTHER PUBLICATIONS

Mehrotra, Design of Molecular Precursors, Jan. 1994, Springer Netherlands, vol. 2, Nos. 1-3, pp. 1-6.*
Bradley, Metal Alkoxides as Precursors for Thin-film Growth, 1990, Phil. Trans. R. Soc. Lond. A 330, 167-171.*
Jones et al., Synthesis and Characterisation of four new heterometal alkoxides: potential precursors for the MOCVD of ferroelectric oxides, J.Mater. Chem., Jan. 2004, 14, 887-894.*

* cited by examiner

*Primary Examiner*—Steven P. Griffin
*Assistant Examiner*—Queenie Dehghan
(74) *Attorney, Agent, or Firm*—Cha & Reiter, LLC

(57) ABSTRACT

A method for fabricating silica glass is disclosed. The method includes the steps of (a) hydrolyzing silicon alkoxide; (b) hydrolyzing heterometal alkoxide containing Bi and Ti components; (c) mixing a solution containing hydrolyzed products of the silicon alkoxide and a solution containing hydrolyzed products of the heterometal alkoxide, thus forming a mixed solution; (d) molding gel by pouring the mixed solution into a forming mold; (e) drying the molded gel; and (e) performing heat-treatment of the dried gel so as to vitrify the gel.

11 Claims, 1 Drawing Sheet

METHOD FOR FABRICATING SILICA GLASS CONTAINING BI AND TI USING A SOL-GEL PROCESS

CLAIM OF PRIORITY

This application claims priority to an application entitled "Method for Fabricating Silica Glass by Sol-Gel Process," filed with the Korean Intellectual Property Office on Jan. 19, 2004 and assigned Serial No. 2004-4004, the contents of which are hereby incorporated by reference.

BACKGROUND OF THE INVENTION

1. Field of the Invention

The present invention relates to a method for fabricating silica glass, in particular, to a method for fabricating silica glass using a sol-gel process.

2. Description of the Related Art

Some convention methods are known to fabricate glass articles of various refractive indices using a sol-gel. In particular, in optical silica glass articles such as optical fibers or lenses, the refractive index is one of the important properties of such materials. Silica glass is generally superior in regards to properties such as thermal stability and strength. Silica glass also has a relatively low coefficient of thermal expansion while being transparent and chemically inert. Due to these superior properties, silica glass is widely used in optical instruments such as optical preform or lenses.

The sol-gel process is a liquid-phase method with high productivity. This is because the sol-gel process allows composition of an article to be freely controlled and is generally preformed at a low temperature. In this regard, it offers very high economy and enables a composition with various composite components to be produced. In addition, the sol-gel process is very useful in fabricating photomasks for semiconductor, silica glass lenses or the like because the process employs high purity materials from the starting materials thereof.

The following is a description regarding a conventional procedure for fabricating silica glass using alkoxysilane.

A hydrolysis reaction is performed by adding alcohol, water, and other substances to silicon alkoxide as solvent. If the reaction is performed under an acid catalyst, a chemically cross-linked monolithic gel is obtained. If the reaction is performed under a base catalyst, a spherical colloidal silica sol is obtained. The resultant product of the hydrolysis reaction is then poured into a casting mold, thereby forming molding gel. The structure of the gel may be varied depending on a relatively contained ratio of silicon alkoxide, water, solvent, etc., or pH of hydrolyzed composition of silicon alkoxide. Thereafter, the gel is dried for a predetermined length of time and then subjected to a heat-treatment at a temperature not lower than about 700° C. As a result, a silica glass tube is obtained.

The gel formed from silicon alkoxide as described above has a problem in that it has a very high percentage of contraction after being dried because very high stress is applied to the gel due to fine pores present while the gel is dried. Accordingly, in order to prevent the gel from cracking while the gel is dried and increase yield of production, a special process is employed for controlling the level for drying the gel. In this regard, an alleviated condition (to maintain relatively low temperature and high humidity) is adopted, or the level for drying the gel is controlled using one or more small openings formed through a cover of the mold. However, because such a method requires substantial time until the drying is completed, sometimes an additive is put into the gel to enhance drying yield.

In order to fabricate silica glass, various components may be used as an additive beyond silicon alkoxide. A metal alkoxide typically added for the purpose of stable and uniform doping is made so that the silicon alkoxide and the metal are mixed and reacted during the step of hydrolysis or polymerization. The metal used in doping is not limited to a particular kind of metal. However, Al, Ti, Zr, or similar types of metals, which each have a refractive index higher than that of silica, may be used when fabricating silica glass for lenses or devices that require a relatively high refractive index.

In order to compensate for eminent difference in the hydrolysis rate between silicon alkoxide and metal alkoxide which are doped, a chelate compound is occasionally used. If a refractive index, a dispersion value, etc. of silica glass to be fabricated are determined, a proper composition for the silica glass is prepared. The silica glass is then fabricated through steps of hydrolysis reaction, polymerization reaction, fabrication of gel, drying, and heat-treatment.

If a single material is doped when silica glass is fabricated, the process of fabrication can be simplified. However, if a significantly high refractive index is required or both a high refractive index and a low dispersion are concurrently required, two or more metals may be needed. If two or more metals are doped, not only the process for fabricating uniform sol is substantially lengthened, but also very complicated calculation is required for controlling reaction rate. For example, when a composite is produced by mixing $Ti(OR)_4$, which is a Ti precursor, and $Bi(OAc)_3$, which is a Bi precursor, the ratio of metal dopants will be locally fluctuated and unevenness between the metal compositions will accelerate crystallization tendency depending on temperature of heat treatment.

Accordingly, what is needed in the art is an improved method.

SUMMARY OF THE INVENTION

One embodiment of the present invention is directed to a method of fabricating silica glass, which has a high refractive index and in which Bi and Ti are evenly doped, by a sol-gel process.

Another embodiment of the present invention is directed to a method of fabricating silica glass by a sol-gel process including the steps of: (a) hydrolyzing silicon alkoxide; (b) hydrolyzing heterometal alkoxide containing Bi and Ti components; (c) mixing a solution containing hydrolyzed products of the silicon alkoxide and a solution containing hydrolyzed products of the heterometal alkoxide, thereby forming a mixed solution; (d) molding gel by pouring the mixed solution into a forming mold; (e) drying the molded gel; and (e) performing heat-treatment of the dried gel so as to vitrify the gel.

Yet another embodiment of the present invention is directed to a method of fabricating a silica glass including the steps of hydrolyzing silicon alkoxide, hydrolyzing heterometal alkoxide containing Bi and Ti components and mixing the hydrolyzed silicon alkoxide and the hydrolyzed heterometal alkoxide to form a solution. The solution is molded in to a form and allowed to dry. The dried solution is then heated to vitrify.

BRIEF DESCRIPTION OF THE DRAWING

The above and other features and embodiments of the present invention will be more apparent from the following detailed description taken in conjunction with the accompanying drawing, in which.

DETAILED DESCRIPTION

Figure 1:
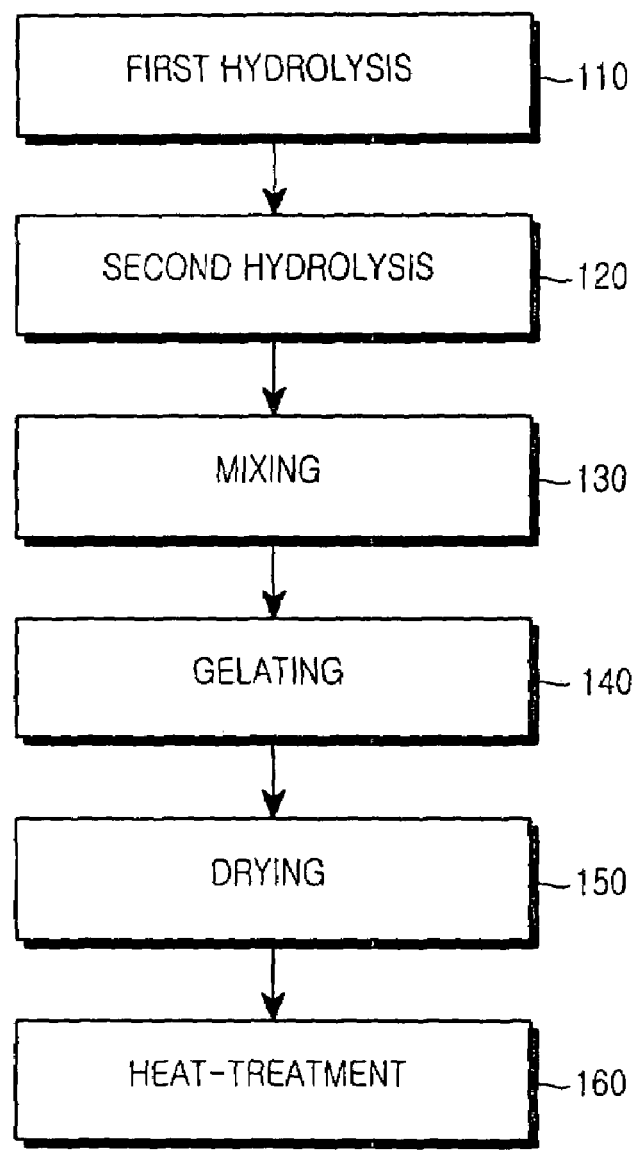
FIG. 1 shows a flowchart of a method for fabricating a silica glass by a sol-gel process according to one embodiment of the present invention.

Hereinafter, embodiments of the present invention will be described with reference to the accompanying drawing. In the following description, a detailed description of known functions and configurations incorporated herein will be omitted when it may obscure the subject matter of the present invention.

FIG. 1 is a flowchart of a method for fabricating silica glass by a sol-gel process according to one embodiment of the present invention. The fabricating method includes the steps of: first hydrolysis 110, second hydrolysis 120, mixing 130, gelating 140, drying 150, and heat-treatment 160.

In the first hydrolysis step 110, silicon alkoxide, which is a starting material, is hydrolyzed. The silicon alkoxide compound is mixed with alcohol. The amount of the alcohol may be in the range of about 1 to 20 times of the silicon alkoxide compound in equivalence ratio. An aqueous solution of hydrochloric acid or similar solution, which acts as an acid catalyst, is then put into the mixture and stirred. In this way, the silicon alkoxide compound is subjected to hydrolysis reaction. It is noted that the silicon alkoxide compound is not limited to a particular kind but may be selected from other substances, e.g., tetramethyl ortho silicate and tetraethyl ortho silicate. The acid catalyst is also not limited to a particular kind and may be selected from, e.g., hydrochloric acid, nitric acid, fluoric acid, acetic acid, etc. The kinds and densities of the silicon alkoxide compound and the acid catalyst are determined considering the conditions for drying and heat-treatment to be followed. It is preferable that the amount of water put into the first hydrolysis step corresponds to about 2 to 4 times of the equivalence of the silicon alkoxide.

In the second hydrolysis step 120, heterometal alkoxide, which is an additive, is hydrolyzed. The heterometal alkoxide helps to evenly dope Bi and Ti. In addition, although various kinds of heterometal alkxoides are present, among others $Bi_4Ti_3O_4(OEt)_{16}$ is used in this embodiment. When hydrolyzing dopants, alcohol is preferably used as solvent and acid catalyst is preferably used as catalyst. The amount of water put into the process of hydrolyzing the dopants corresponds to 8 to 16 times of the equivalence of heterometal alkoxide.

The amount of alcohol used as solvent in hydrolyzing the dopants and the method for putting the alcohol into the hydrolysis process should be considered. In one embodiment, the amount of alcohol is not less than about 10 times of that of $Bi_4Ti_3O_4(OEt)_{16}$ in mole ratio, although other amounts of alcohol are possible. In another embodiment, a small amount of acid aqueous solution is added while violently stirring the mixed solution of alcohol and dopants to prevent heterogeneous precipitation of sol. Alternatively, in order to control the hydrolysis rate of the heterometal alkoxide as being doped, it is possible to render the heterometal alkoxide to react with chelate compound such as acetylacetone.

In the mixing step 130, a solution containing hydrolyzed products of $Bi_4Ti_3O_4(OEt)_{16}$ is added into a solution containing hydrolyzed products of the silicon alkoxide. In one embodiment, the amount of dopants is less than or equal to 50% in mole ratio, although other amounts of dopants may be possible.

In the gelating step 140, the mixed solution from the mixing step is evenly stirred to form a homogeneous phase and then poured into a mold. The mixed solution has good fluidity at the early stage of molding. However, the mixed solution loses the fluidity and become gelated as time goes by. The gelating is completed within 48 hours at room temperature. However, within a constant temperature and humidity chamber of 50° C., the gelating may be completed within 10 hours.

In the drying step 150, the gel molded in the gelating step is dried within a constant temperature and humidity chamber, of which the temperature and humidity are controlled to prevent the molded gel from cracking.

In the heat-treatment step 160, the gel dried in the drying step is heated in order to vitrify the gel. Typically, such a heat-treatment step can be performed within an electric furnace or the like; although the heating temperature may be varied depending on the composition of the gel, the heat-treatment is performed in the range of 400° C. to 1000° C.

The method for fabricating silica glass by a sol-gel process is exemplified as follows.

EXAMPLE

Ethanol, the amount of which corresponds to 2M (mole), and tetraethyl ortho silicate, the amount of which corresponds to 1M, are mixed and stirred. Diluted solution of 0.1N (normal) hydrochloric acid is put into the resultant product so that the amount of water becomes 3M. 0.2M $Bi_4Ti_3O_4(OEt)_{16}$, 2M ethanol, 8M water and hydrochloric catalyst are mixed and subjected to hydrolysis reaction. A solution containing hydrolyzed products of the $Bi_4Ti_3O_4(OEt)_{16}$ is put into a solution containing hydrolyzed products of the silicon alkoxide, and the solutions are stirred so that a homogeneous phase is produced. If a homogeneous phase is observed with the naked eye, the mixed solution formed is poured into a prepared mold (a hemi-sphere having a diameter of 2 cm) and then induced to gelate within an oven of 50° C. For the purpose of drying, the mold is received in a container allowing limited exposure and the gel is dried within a constant temperature and humidity chamber with temperature of 40° C. and humidity of 80%. Such drying requires about seven days. After the drying is completed, the gel is subjected to heat-treatment within an electric furnace of about 600° C. Consequently, a silica glass is fabricated through the aforementioned steps.

As described above, one aspect of the first embodiment described above for fabricating a silica glass by a sol-gel process is that Bi and Ti are evenly doped and a high refractive index can be obtained by mixing a solution containing hydrolyzed products of the silicon alkoxide and a solution containing hydrolyzed products of the heterometal alkoxide.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of fabricating a silica glass, comprising the steps of:
   (a) hydrolyzing silicon alkoxide;
   (b) hydrolyzing heterometal alkoxide containing Bi and Ti components;
   (c) mixing a solution containing hydrolyzed products of the silicon alkoxide and a solution containing hydrolyzed products of the heterometal alkoxide to form a mixed solution;
   (d) molding gel by pouring the mixed solution into a forming mold;
   (e) drying the molded gel; and
   (f) performing heat-treatment of the dried gel so as to vitrify the gel.

2. The method as claimed in claim 1, wherein the heterometal alkoxide comprises $Bi_4Ti_3O_4(OEt)_{16}$.

3. The method as claimed in claim 1, wherein acid catalyst is used in steps (a) and (b).

4. The method as claimed in claim 3, wherein the acid catalyst is selected from the group consisting of hydrochloric acid, nitric acid, fluoric acid and acetic acid.

5. The method as claimed in claim 1, wherein alcohol is used in step (b) and the amount of alcohol is not less than 10 times of that of the heterometal alkoxide in mole ratio.

6. The method as claimed in claim 1, wherein, in step (f), the gel is subjected to heat-treatment at a temperature not higher than 1000° C.

7. The method as claimed in claim 6, wherein the gel is subjected to heat-treatment at a temperature higher than 400° C.

8. A method of fabricating a silica glass, comprising the steps of:
   (a) hydrolyzing silicon alkoxide;
   (b) hydrolyzing heterometal alkoxide containing Bi and Ti components;
   (c) mixing the hydrolyzed silicon alkoxide and the hydrolyzed heterometal alkoxide to form a solution;
   (d) molding the solution in a form;
   (e) allowing the molded solution to dry; and
   (f) vitrifying the dried solution.

9. The method as claimed in claim 8, wherein the heterometal alkoxide comprises $Bi_4Ti_3O_4(OEt)_{16}$.

10. The method as claimed in claim 8, wherein, in step (f), the dried solution is subjected to heat at a temperature not higher than 1000° C.

11. The method as claimed in claim 10, wherein the dried solution is subjected to heat at a temperature higher than 400° C.

* * * * *